Patented May 19, 1931

1,806,040

UNITED STATES PATENT OFFICE

HORACE G. BYERS, OF NEW YORK, N. Y., ASSIGNOR TO THE RUBBER SERVICE LABORATORIES COMPANY, OF AKRON, OHIO, A CORPORATION OF OHIO

AGE RESISTING VULCANIZED RUBBER COMPOSITION

No Drawing. Application filed October 8, 1927. Serial No. 225,029.

The present invention relates to the manufacture of a vulcanized rubber product by an improved process wherein there is employed, in addition to the ordinary compounding ingredients, a new type of reaction product capable of imparting age resisting or anti-oxidant characteristics to the rubber product.

It is well known in the art to which this invention pertains that the use of certain organic compounds as accelerators of the rubber vulcanization process is practically precluded because of the fact that the presence of such compounds, or of their heat decomposition or sulphur or other reaction products produced in the rubber curing process, apparently cause or aid in causing a relatively rapid deterioration of the vulcanized products. Such rubber products are said to age badly, that is, the rubber becomes hard and loses a large part of its resiliency, while other characteristics such as tensile strength and the like are very detrimentally affected. It has now been found that the deterioration of the rubber compound may be substantially decreased and the effective life of the product materially lengthened if there be added to the rubber compound a small proportion of such compounds as the reduced and preferably the leuco derivatives of an indamine and indophenol and like compounds containing within their molecule the grouping —N=, wherein the N atom is positioned between two aryl groups, one of which aryl groups contains an oxygen atom as a substituent thereof. The preferred class of anti-oxidants particularly comprises the derivatives obtained by employing in the manufacture of the desired compounds, primary or secondary aromatic amines having the para position of the ring unoccupied by any substituting group or atom.

The indo-phenols preferred for use in the production of those products employed in the process as hereinafter set forth have been manufactured in the well known manner by reacting amines such as di-phenyl-amine, aniline, o-toluidine, m-phenylene-diamine and other amino compounds having the para position thereof unoccupied, under controlled temperature conditions in sulphuric acid with nitroso compounds such as nitroso-phenol, nitroso-cresol, nitroso-dimethyl aniline and the like. The various indo-phenols so obtained were reduced to their leuco form by means of suitable agents such as sodium sulphide and the like. The resulting leuco compound, in the case where diphenyl-amine and nitroso-phenol were combined, possesses the following structure

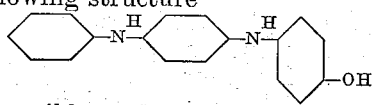

It is possible and quite probable that the compound active as an anti-oxidant in the rubber stock wherein a reduced indo-phenol or the leuco indo-phenol is employed, may comprise some derivative, reaction product or heat decomposition product of these bodies and such product or derivatives are to be considered as included within the scope of this invention.

The vulcanization accelerating power of the class of compounds disclosed herein is illustrated by the following example, wherein the leuco base of di-phenyl-amino-indophenol, which may be called p-phenyl-amino p-hydroxy diphenyl amine was employed. A rubber stock was prepared in the usual manner comprising 100 parts of pale crepe rubber,
5 parts of zinc oxide,
3 parts of sulphur,
0.25 parts of thermatonic black,
5 parts of the leuco base mentioned.

The stock so obtained was then vulcanized by heating in a press for varying times at a temperature of 287° F. The vulcanized stock was then tested and the following results obtained:

Table A

| Time of cure | Modulus of elasticity in lbs./in² at elongations of— | | | Tensile at break in lbs./in² | Ultimate elongation |
|---|---|---|---|---|---|
| | 300% | 500% | 700% | | |
| 40 minutes at 287° F | 124 | 278 | 918 | 2065 | 825% |
| 1 hour at 287° F | 196 | 437 | 1595 | 2560 | 780% |

The stocks were then subjected to an artificial ageing test by heating samples thereof for approximately 18 hours in a bomb maintained under a pressure of 500 pounds oxygen to the square inch and at a temperature of 90° C. After ageing, it was observed that the stocks were in very good condition and had withstood the severe ageing test in a satisfactory manner.

Although the preferred class of anti-oxidants possess accelerating power of their own as shown in the preceding example, it is usually preferred to employ the anti-oxidant of the type set forth in addition to a small proportion of any well known vulcanization accelerator. Thus, an accelerator such as di-phenyl-guanidine known in the art to produce a product that ages badly, was employed in conjunction with the new type of anti-oxidant in order to test these compounds under such conditions that the effect on the stock of the addition of the anti-oxidant would be more readily apparent.

A rubber stock was manufactured comprising 80 parts of plate crepe rubber,
    4 parts of zinc oxide,
    1.8 parts of sulphur,
    0.8 parts of di-phenyl-guanidine,
    4.0 parts of leuco base of di-phenyl-amine-indo-phenol.

This stock was then vulcanized in the usual manner and tested. Duplicate samples of the sheets tested were subjected to an artificial ageing test known as the Bierer-Davis method wherein the samples were subjected to heating for about 20 hours in a bomb maintained under a temperature of 90° C. and under a pressure of 500 pounds of oxygen per square inch. The aged samples were then tested and the results compared with those given by the unaged samples. The results obtained were as follows:

Table B

| Time of cure | Aged | Modulus of elasticity in lbs./in² at elongations of— | | | Tensile at break in lbs./in² | Ultimate elongation |
|---|---|---|---|---|---|---|
| | | 300% | 500% | 700% | | |
| 40 minutes at 287° F | Hours 0 | 170 | 437 | 1650 | 2760 | 790% |
| | 20 | 237 | 692 | — | 1850 | 660% |

The decrease in tensile strength resulting from the very severe ageing test to which the sample was subjected is seen to be approximately one-third of the original tensile strength of the stock. Moreover, the stock still retained its characteristic appearance and was not blistered as a result of the test. The preferred type of anti-oxidant herein disclosed is shown from the above to produce a rubber product that is very resistant to ageing even when subjected to particularly severe oxidation treatment.

On the other hand, a rubber stock containing all the ingredients in the same proportion as set forth in the example given except that no anti-oxidant was employed, was found after ageing in the manner described to have completely softened down to a sticky shapeless mass possessing none of the characteristics of vulcanized rubber.

The new type of anti-oxidants disclosed herein have also been tested in a rubber stock of a different composition wherein a lesser proportion of the anti-oxidant was employed than was used in the previous example. A stock was compounded which comprised 100 parts of pale crepe rubber,
    5 parts of zinc oxide,
    3 parts of sulphur,
    0.25 parts of thermatonic black,
    0.8 parts of di-phenyl-guanidine,
    1.0 parts of anti-oxidant.

The stock was mixed in the usual manner and was then vulcanized and tested. The results obtained by testing the stock vulcanized under the conditions set forth are shown in the following table:

Table C

| Anti-oxidant | Time of cure | Aged | Modulus of elasticity in lbs./in² at elongations of— | | | Tensile in lbs./in² at break | Ultimate elongation |
|---|---|---|---|---|---|---|---|
| | | | 300% | 500% | 700% | | |
| Leuco base of di-phenyl-amino-indo-phenol. | 30 minutes at 40 lbs. steam. | Hours 0 | 190 | 412 | 1570 | 3140 | 820 |
| | | 36 | 205 | 513 | 1988 | 2810 | 765 |
| Do | 40 minutes at 40 lbs. steam. | 0 | 192 | 467 | 1950 | 3380 | 800 |
| | | 36 | 225 | 661 | 2495 | 2920 | 750 |
| Do | 1 hour at 40 lbs. steam. | 0 | 250 | 644 | 2750 | 3930 | 780 |
| | | 36 | 347 | 1020 | — | 3385 | 695 |
| Do | 1½ hours at 40 lbs. steam. | 0 | 260 | 742 | 2910 | 3600 | 750 |
| | | 36 | 404 | 1143 | — | 2850 | 650 |

The ageing of the samples set forth in the table above was carried out by subjecting the samples for approximately 36 hours to the action of oxygen in a bomb under 300 pounds pressure per square inch and at a temperature of 70° C. A second series of ageing tests were carried out in which the samples were subjected to an artificial ageing step wherein the samples were aged for 18 hours under 500 pounds pressure per square inch of oxygen at 90° C. In all cases, wherein the leuco base of di-phenyl-amino-indo-phenol was employed as an anti-oxidant, the vulcanized samples withstood the ageing tests very successfully and remained in good condition even in those cases where the sample had been overcured. In no cases were the samples destroyed as a result of the test described. Furthermore, the tensile strengths of the aged samples were substantially unimpaired and any decrease in strength that did occur was very uniform.

Another example illustrative of the applicability of the new type of anti-oxidant is the manufacture of a shoddy stock, that is one containing a large proportion of reclaimed rubber. Such a stock comprises 20 parts of smoked sheet rubber,
66.5 parts of carcass reclaimed rubber,
10 parts of zinc oxide,
2.5 parts of sulphur,
0.375 parts of di-phenyl-guanidine,
0.999 parts of leuco base of di-phenyl-amine-indo-phenol.

Samples of the above stock were cured at 20, 25 and 30 minutes in a press maintained under the temperature given by forty pounds of steam pressure per square inch. The vulcanized samples were then tested and compared with like samples, cured under the same conditions, and aged for 36 hours under the conditions hereinbefore described. The results obtained are shown in the following table:

Table D

| Time of cure at 40 lbs. steam | Aged | Modulus of elasticity in lbs./in² at elongations of— | | Tensile in lbs./in² at break | Per cent ultimate elongation | Per cent drop in tensile after ageing |
|---|---|---|---|---|---|---|
| | | 300 per cent | 500 per cent | | | |
| 20 minutes | 0 hours | 365 | 940 | 1895 | 655 | 2.9 |
| Do | 36 hours | 430 | 1135 | 1840 | 620 | |
| 25 minutes | 0 hours | 349 | 919 | 1775 | 625 | |
| Do | 36 hours | 438 | 1125 | 1690 | 595 | 4.9 |
| 30 minutes | 0 hours | 435 | 1103 | 1985 | 620 | |
| Do | 36 hours | 550 | 1425 | 1725 | 565 | 13 |

It is apparent from the above table that the new type of anti-oxidants impart particularly valuable age resisting characteristics to a vulcanized rubber stock containing a large proportion of reclaimed rubber. Not only was the tensile strength of the stock retained practically unimpaired but the stock did not show the softening and blistering effects exhibited after ageing of similar compounds in which aldehyde-amine anti-oxidant products were employed.

Other reduced indo-phenols and leuco bases of those compounds hereinbefore mentioned have likewise been found to exert an anti-oxidant effect analogous to that shown in the examples when employed in the cure of rubber in the manner as described. The various examples hereinbefore given are to be understood as illustrative and not limitative of the scope of this invention. Other compounding ingredients and different proportions of ingredients than those actually set forth in the examples are possible and are apparent to those skilled in the art to which the invention pertains. Furthermore, the invention is not limited by any theories advanced by way of explanation of the chemical changes taking place in the manufacture of the compounds set forth but is to be considered as limited solely by the claims attached hereto as a part of this specification, wherein I intend to claim all novelty inherent in my invention as is permissible in view of the prior art.

What is claimed is:

1. The process of manufacturing a vulcanized rubber product possessing age resisting characteristics which comprises incorporating with said product prior to vulcanization a reduced reaction product of a non-substituted aromatic secondary amine with a nitroso-phenol.

2. The process of manufacturing a vulcanized rubber product possessing age resisting characteristics which comprises incorporating with said product prior to vulcanization a reduced di-phenyl-amine-indo-phenol compound.

3. The process of manufacturing a vulcanized rubber product possessing age resisting characteristics which comprises incorporating with said product prior to vulcanization p-phenyl amino p-hydroxy di-phenyl amine.

4. An age resisting rubber product comprising the vulcanization product of a rubber stock containing prior to the vulcanization of said stock a reduced reaction product of a non-substituted aromatic secondary amine with a nitroso-phenol.

5. An age resisting rubber product comprising the vulcanization product of a rubber stock containing prior to the vulcanization of said stock a reduced di-phenyl-amine-indo-phenol compound.

6. An age resisting rubber product comprising the vulcanization product of a rubber stock containing prior to the vulcanization of said stock p-phenyl amino p-hydroxy di-phenyl amine.

In testimony whereof I hereunto affix my signature.

HORACE G. BYERS.